(Model.)

J. PAISLEY.
NUT LOCK.

No. 338,866. Patented Mar. 30, 1886.

Witnesses:
N. S. Hammack
Thos. Johnston

Inventor:
John Paisley,
per A. F. Rohdn,
Attorney.

UNITED STATES PATENT OFFICE.

JOHN PAISLEY, OF BURLINGTON, IOWA.

NUT-LOCK.

SPECIFICATION forming part of Letters Patent No. 338,866, dated March 30, 1886.

Application filed August 21, 1884. Serial No. 141,188. (Model.)

*To all whom it may concern:*

Be it known that I, JOHN PAISLEY, a citizen of the United States, residing at Burlington, in the county of Des Moines and State of Iowa, have invented a new and useful Improvement in Nut-Locks, of which the following is a specification.

My invention relates to improvements in nut-locks in which a washer having a spring-click operates in conjunction with a nut having a ratchet and a bolt with groove; and the object of my invention is to provide means for fastening a bolt-nut in place, and preventing its becoming loose by the jarring or tremulous motion of machinery. I attain these objects by the mechanism illustrated in the accompanying drawings, in which—

Figure 1:
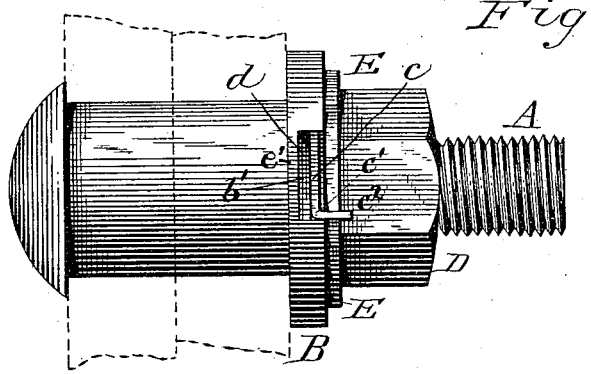
Figure 2:
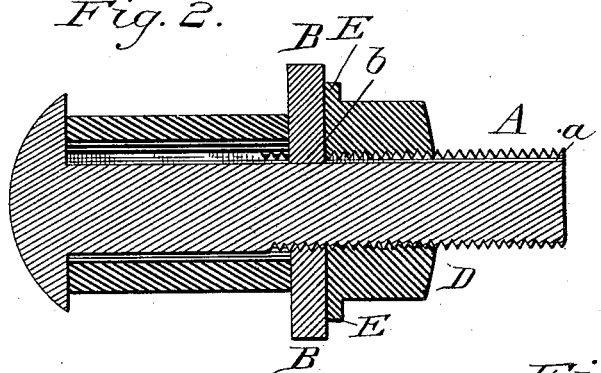
Figure 3:
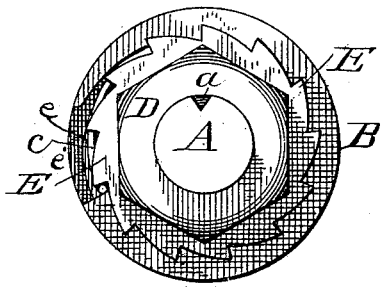
Figure 4:
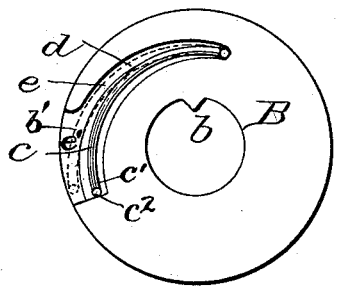

Figure 1 is a plan view of the device. Fig. 2 is a longitudinal section. Fig. 3 is an end view, looking at nut D; Fig. 4, an outside view of washer B.

Similar letters refer to similar parts throughout the several views.

In the drawings, A is a screw-threaded bolt having groove $a$.

B is a washer provided with a spline, $b$, which fits into groove $a$. Washer B also has the spring-click $c$ embedded in groove $d$. Groove $d$ has the recess $e$, as illustrated in the drawings.

D is a nut having on its inner end the ratchet E.

The operation of my invention is as follows: Upon screw-threaded bolt A, having groove $a$, I place the washer B so that the spline $b$ will slide along $a$, and so that that side of the washer having the spring-click $c$ will face outward. I then place nut D upon the bolt so as to bring the ratchet next to the washer. As the nut is tightened, the spring-click $c$ will engage with the ratchet E and hold the nut so as to prevent it from becoming loose. If the nut is to be loosened, the spring-click is pressed back into recess $e$, which will disengage it from the ratchet, and thus enable the operator to unloosen the nut. It is evident that I need not confine myself to the arrangement of having the ratchet on the nut and the spring-click and groove on the washer. Instead of that, I may have this arrangement reversed; and it will be seen, also, that the only effect of the groove in the bolt and the spline in the washer is to prevent the washer from turning on the bolt. The same thing may also be accomplished by having the bolt cornered instead of round and the hole in the washer of a corresponding shape.

I am aware of a nut-lock the washer of which has a spring-pawl to engage a ratchet on the nut. In such devices, however, the pawl and spring are separate and extend more or less beyond the circumference of the washer.

In my device the groove $d$ is made in one face of the washer B, and is curved, as shown. This groove has formed at its bottom the recess $e$ back of the wall $e'$, and in the edge of the washer is formed a nick, $b'$. The spring $c$ is secured within the groove $d$, having the curve thereof, and with its free end $c'$ at the nick $b'$ and turned to one side, forming the catch $c^2$, for catching the ratchet on the nut.

What I claim is—

The bolt A, having the groove $a$, in combination with the washer B, having the spline $b$, the groove $d$, formed in one of its faces, and with the recess $e$ back of the wall $e'$, the nick $b'$, the spring-pawl $c$, secured in the groove $d$, and having the catch end $c'$ at the nick $b'$, and the nut D, having the ratchet E, as set forth.

JOHN PAISLEY.

Witnesses:
 N. S. HAMMACK,
 FRANK E. ALTER.